United States Patent
Hanson et al.

(10) Patent No.: US 12,162,478 B2
(45) Date of Patent: Dec. 10, 2024

(54) OBSTACLE MANEUVER ASSISTANCE SYSTEMS AND METHODS FOR VEHICLES

(71) Applicant: Ford Global Technologies, LLC, Dearborn, MI (US)

(72) Inventors: Ryan Hanson, Livonia, MI (US); Pietro Buttolo, Dearborn, MI (US); John Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 189 days.

(21) Appl. No.: 17/547,425

(22) Filed: Dec. 10, 2021

(65) Prior Publication Data

US 2023/0182720 A1   Jun. 15, 2023

(51) Int. Cl.
| | |
|---|---|
| *B60W 30/09* | (2012.01) |
| *B60G 17/0165* | (2006.01) |
| *B60Q 9/00* | (2006.01) |
| *B62D 15/02* | (2006.01) |
| *G01C 21/00* | (2006.01) |

(Continued)

(52) U.S. Cl.
CPC ......... *B60W 30/09* (2013.01); *B60G 17/0165* (2013.01); *B60Q 9/008* (2013.01); *B62D 15/0265* (2013.01); *B62D 15/029* (2013.01); *G01C 21/12* (2013.01); *G01C 21/3826* (2020.08); *G08G 1/096791* (2013.01); *B60G 2500/30* (2013.01); *B60W 2554/00* (2020.02); *B60W 2710/20* (2013.01);
(Continued)

(58) Field of Classification Search
CPC ............. B60W 30/09; B60W 2554/00; B60W 2710/20; B60W 2710/22; B60W 2720/10; B60W 2720/12; B60G 17/0165; B60G 2500/30; B60Q 9/008; B62D 15/0265; B62D 15/029; G01C 21/12; G01C 21/3826; G08G 1/096791
See application file for complete search history.

(56) References Cited

U.S. PATENT DOCUMENTS 7,441,624 B2 * 10/2008 Tobata .................. B60R 21/013
701/45
9,440,507 B2 * 9/2016 Giovanardi ............. F16K 31/12
(Continued)

FOREIGN PATENT DOCUMENTS

| CN | 105501220 B | * 11/2018 | ............ B60W 30/09 |
| CN | 112721802 A | * 4/2021 | |

(Continued)

OTHER PUBLICATIONS

Local Behavior based navigation (Year: 2018).*
(Continued)

*Primary Examiner* — Joseph M Rocca
*Assistant Examiner* — Kyle T Johnson
(74) *Attorney, Agent, or Firm* — Frank Lollo; Eversheds Sutherland (US) LLP (57) ABSTRACT

An example vehicle can include a sensor platform and a controller that is configured to determine an object that is in front of the vehicle, determine the object as a hazard by at least one of determining, using dead reckoning, that the object is in a path of travel of the vehicle that will cause the object to travel under a restricted zone of the vehicle and/or the object has a height that is higher than a vehicle ride height.

18 Claims, 3 Drawing Sheets

(51) Int. Cl.
  *G01C 21/12*  (2006.01)
  *G08G 1/0967*  (2006.01)
(52) U.S. Cl.
  CPC ..... *B60W 2710/22* (2013.01); *B60W 2720/10* (2013.01); *B60W 2720/12* (2013.01)

(56) References Cited

U.S. PATENT DOCUMENTS

| | | | | |
|---|---|---|---|---|
| 9,597,940 | B2* | 3/2017 | Anderson | H02P 21/06 |
| 10,414,235 | B1* | 9/2019 | Yassan | G01S 7/539 |
| 11,117,626 | B2* | 9/2021 | Salter | B60R 19/023 |
| 2003/0149530 | A1* | 8/2003 | Stopczynski | G08G 1/165 |
| | | | | 340/436 |
| 2010/0079283 | A1* | 4/2010 | Hammerschmidt | |
| | | | | G01D 5/2405 |
| | | | | 340/562 |
| 2010/0164703 | A1* | 7/2010 | Visconti | B60W 40/09 |
| | | | | 340/438 |
| 2010/0253594 | A1* | 10/2010 | Szczerba | G08G 1/167 |
| | | | | 345/7 |
| 2012/0123646 | A1* | 5/2012 | Mantini | B62D 61/12 |
| | | | | 73/488 |
| 2015/0061895 | A1* | 3/2015 | Ricci | B60K 28/00 |
| | | | | 340/902 |
| 2015/0203117 | A1* | 7/2015 | Kelly | B60W 40/06 |
| | | | | 701/91 |
| 2016/0332569 | A1* | 11/2016 | Ishida | B60W 30/09 |
| 2017/0129298 | A1* | 5/2017 | Lu | B60G 17/015 |
| 2017/0137023 | A1* | 5/2017 | Anderson | B60G 17/02 |
| 2018/0056745 | A1* | 3/2018 | Saylor | B60G 17/0165 |
| 2018/0194411 | A1* | 7/2018 | Liivik | G05D 1/021 |
| 2019/0359025 | A1* | 11/2019 | Wager | B60G 21/073 |
| 2021/0031753 | A1 | 2/2021 | Buttolo et al. | |
| 2021/0208607 | A1* | 7/2021 | Smits | G01S 17/931 |
| 2021/0237594 | A1* | 8/2021 | Prasad | H04N 23/635 |
| 2021/0373575 | A1* | 12/2021 | Manjunath | G08G 1/163 |
| 2022/0281456 | A1* | 9/2022 | Giovanardi | B60W 30/16 |
| 2023/0182720 | A1* | 6/2023 | Hanson | B60W 30/09 |

FOREIGN PATENT DOCUMENTS

| | | | | |
|---|---|---|---|---|
| EP | 2674308 | A1 * | 12/2013 | ........ B60G 17/0155 |
| EP | 2905156 | A1 * | 8/2015 | ........ B60G 17/0165 |
| EP | 3689696 | B1 * | 11/2023 | ........... B60W 10/18 |
| WO | 2010097251 | A1 | 9/2010 | |
| WO | WO-2010097251 | A1 * | 9/2010 | ............. B60T 11/16 |
| WO | WO-2022112467 | A2 * | 6/2022 | ........... B60G 17/015 |

OTHER PUBLICATIONS

EP-2905156-A1 translation (Year: 2015).*
EP-2674308-A1 translation (Year: 2013).*
WO-2010097251-A1 translation (Year: 2010).*
CN-112721802-A translation (Year: 2021).*
CN-105501220-B translation (Year: 2018).*
Obstacle Detection Safety Feature: My Car Does What, The University of Iowa, National Safety Council, https//mycardoeswhat.org/safety-features/obstacle-detection, 2021, 1-9.

* cited by examiner

OBSTACLE MANEUVER ASSISTANCE SYSTEMS AND METHODS FOR VEHICLES

BACKGROUND

All vehicles have underbody systems, such as oil pans, catalyst convertors, tie rods, and the like, that can be damaged by boulders or other objects as the vehicle traverses them. These problems can be exacerbated when there is an abrupt change in vehicle height as a wheel or wheels go over an obstacle. As vehicle electrification gains market prevalence, more and more sensitive components, such as charging coils, direct current-to-direct current converters, and the like, may be mounted to the vehicle's underbody exposing them to contact with objects and/or obstructions that may be encountered when driving the vehicle.

Although objects capable of impacting the underside of the vehicle may be more prevalent in off-road driving, objects, such as debris (which may include tire pieces, vehicle components, furniture, construction and/or yard materials and/or tools), rocks, ice chunks, breakover events, curbs and road construction and/or degradation, may be encountered as part of the normal driving cycle. A breakover event may involve terrain that includes a relatively steep incline followed by a flat or decline which results in the undercarriage of the vehicle hitting or dragging between the wheels, such as may occur going over a tall rock or high curb or steep driveway apron. Some changes in approach or departure angles may be associated with a likelihood of impact to a front or rear facia of the vehicle, as well as the undersides of the vehicle. Strikes, impacts, and/or hits received from these objects to sensitive underbody components can result in unexpected costs, repairs, delays, and/or stranding of the vehicle and/or user and ultimately a poor user experience.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure pertains to obstacle maneuver assistance systems and methods for vehicles. An example system can include the use of a Macro Capacitive Sensor (MCS) in the detection, avoidance, and/or mitigation of impacts from defined objects on sensitive components of the vehicle underbody to prevent their damage and/or lack of operation. These systems and methods leverage "no or low impact zones" and the use of sensing technologies and automated driving features to guide the vehicle and/or driver to allow objects to transit the vehicle underside while preventing or limiting their incursion into the zones. These systems and methods are distinct from camera-based undercarriage monitors which are inherently exposed to mud, dirt, snow, ice, and other debris, which may obscure the camera(s). Capacitive sensors can filter out such obstructions if they accumulate slowly.

The "no or low impact zones" may be defined for areas of the vehicle underbody where sensitive components may be mounted. These zones may be protected from strikes from objects. An object can be sensed and measured. The systems and methods can determine an object that is of sufficient size (such as height with respect to the surrounding ground level or angle) and is aligned with a trajectory (position and direction of travel of the vehicle). The systems and methods can determine that the object may encroach on sensitive components within one or more of these zones.

Automated driver-assist features (or other equivalents) can be executed to adjust any one or more of vehicle direction, speed of travel, and/or ride height (if equipped) to maneuver the vehicle so as to allow the vehicle to ensure that the "no or low impact zones" stay free and clear of the object. In some instances, the vehicle may not be able to avoid an object from transitioning through a "no or low impact zone" if the vehicle is unable to perform one or more of the aforementioned maneuvers due to mitigating circumstances (e.g., surrounding traffic and/or conditions prevent the maneuver). In these instances, a strike warning can be presented to the user through a display of the vehicle. A strike warning can indicate that a strike or impact is likely or has already occurred. If possible the vehicle can attempt to minimize the ingress and/or the force of strike objects into the zone.

An approaching object such as a rock or other obstacle may be identified through the use of forward-looking cameras, micro-capacitive sensing (MCS), LiDAR, and/or radar. In other embodiments, ultra-wide band (UWB) pulse radar and ultrasonic sensors may also be used in these tasks, each has unique applications and/or failure modes. Further, the rock or other fixed obstacles may be known from GPS tagging by other vehicles that have traveled the area or the subject vehicle itself that may traverse the subject route repeatedly. Moreover, vehicles may communicate information gathered about an obstacle with other vehicles. For example, a vehicle of the present disclosure can share parameters of an obstacle such as location and/or height to other vehicles in the area via Vehicle-to-Vehicle (V2V) communication allowing following vehicles to better optimize their approach and/or speed to clear and/or avoid the detected object. While V2V has been disclosed as an example, other communication methods such as Vehicle-to-Everything (V2X) can also be used. This enables a crowd-source on how the vehicle should navigate it given its unique underbody configuration and/or suspension characteristics.

To provide the most time to react to an obstacle, the sensing elements can be placed as far in front of the vehicle as possible to detect incoming obstacles while driving forward, and/or as far in the back to detect incoming obstacles while backing up. In one example, a single sensor may be placed on a front and underside of a front bumper. Alternatively, a multi-segment sensing area can be implemented. A collision prevention module could map sensitive underbody areas of the car and use dead-reckoning to determine which of these areas might be hit by an object detected by one of the sensing elements.

Also, a controller can be used to detect and warn a driver of the amount of "reaction time" available as a function of the current vehicle speed relative to an upcoming object. The controller can warn the user when they are driving too fast when objects are proximate to the vehicle.

ILLUSTRATIVE EMBODIMENTS

Figure 1:
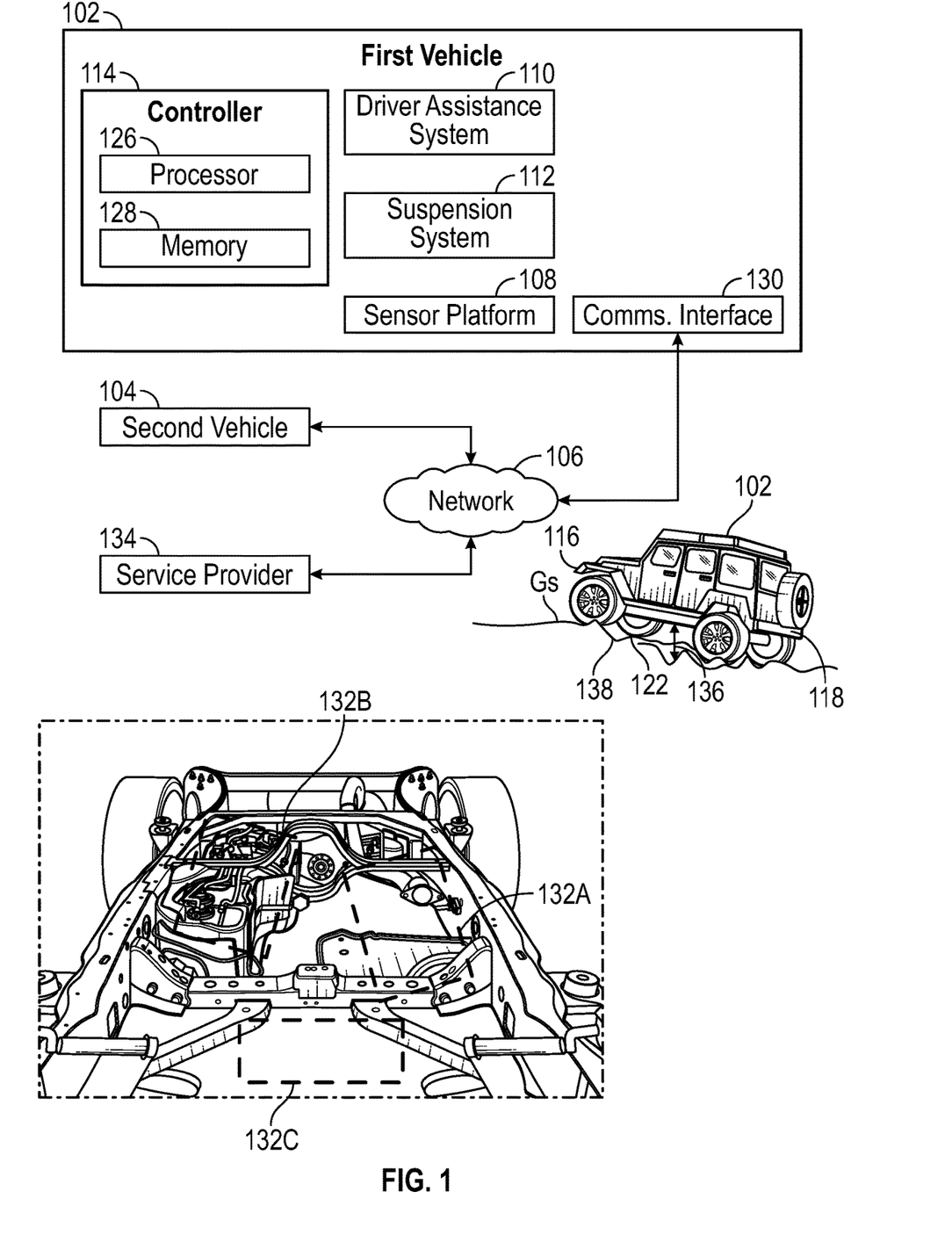
FIG. 1 illustrates an example environment where aspects of the present disclosure may be practiced.

Turning now to the drawings, FIG. 1 depicts an illustrative architecture 100 in which techniques and structures of the present disclosure may be implemented. The architecture 100 includes a first vehicle 102, a second vehicle 104, and a network 106. The network 106 can include combinations of networks. For example, the network 106 may include any one or a combination of multiple different types of networks, such as cellular, cable, the Internet, wireless networks, and other private and/or public networks. The network 106 can include either or both short and long-range wireless networks. In one example, the first vehicle 102 and the second vehicle 104 can communicate with one another using a vehicle-to-vehicle (V2V) communication link.

The first vehicle 102 can comprise a sensor platform 108, a driver assistance system 110, a suspension system 112, and a controller 114. The sensor platform 108 can include forward-looking cameras, micro-capacitive sensing (MCS), LiDAR, radar, ultra-wide band (UWB) pulse radar, ultrasonic, or other similar sensors. In one example, the first vehicle 102 includes a sensor or set of sensors that are mounted on an underside of a front bumper 116 of the first vehicle. Sensors can be horizontally aligned along the underside of the front bumper 116 to provide multizone sensing. Likewise, a sensor or set of sensors that are mounted on an underside of a rear bumper 118 of the first vehicle.

The driver assistance system 110 can be utilized by the controller 114 to automatically avoid detected objects. In some instances, when avoidance of an object is not possible due to extenuating circumstances, the controller 114 can cause the driver assistance system 110 to take other mitigating steps to reduce a likelihood that a sensitive vehicle component may be damaged by the object.

The controller 114 can comprise a processor 126 and memory 128. The processor 126 executes instructions stored in memory 128 to perform any of the methods disclosed herein. When referring to actions performed by the controller 114, it will be understood that this includes execution of instructions by the processor 126. The first vehicle 102 can also comprise a communications interface 130 that allows the controller 114 to access the network 106.

The controller 114 can identify restricted zones (e.g., No or Low Impact Zones) or areas on the undercarriage of the first vehicle 102. For example, the controller 114, can identify three example restricted zones 132A, 132B, 132C that are each associated with vehicle components that are sensitive and may be damaged if hit by, or otherwise contacted, by an object. The controller 114 can map the relative locations of each of these zones compared with a boundary of the chassis of the vehicle. Fewer or more restricted zones can be defined. The exact size and location of each restricted zone may vary according to vehicle design.

Stated otherwise, the restricted zones on the underbody of the vehicle may be areas where vehicle components may be mounted that require protection from or should avoid being struck and/or impacted by large obstacles which may cause them damage or to fail. These components may include but are not limited to coolers, connections, converters, lines, and/or coils which if damaged may cause performance issues and/or lack of operation of the vehicle but may not be protected through the traditional use of rails or shields. In one example, with respect to a vehicle charging coil, the controller 114 may define this area using sensor arrays such as one or more MCS sensors. The output of the sensors can be used to understand, characterize, and determine an object's likelihood to strike and/or hit these components based on the path of travel of the vehicle.

Once a vector of a likely object has been determined, the controller 114 may slow the first vehicle 102 in response. The controller 114 may also determine what steerage may be used to avoid the object. In one example, vehicle steering controls can provide a series of nudges to help the driver steer to a correct angle to avoid the object or to align the wheels/tires to it to go over the object. Thus, the controller 114 can alert the driver with steering wheel-related feedback, such as nudges, vibrations, and so forth.

If equipped, the controller 114 may cause the suspension system 112 to raise the chassis of the vehicle to move the components and avoid the object. That is, the controller 114 can cause the suspension system 112 to selectively alter a vehicle ride height to be greater than the height of the object. In some instances, this includes setting the vehicle ride height to a value that is a set height above the object to allow for movement of the suspension system 112 when the object is passed over. That is, if the suspension system 112 is set to merely clear the object, road slope or other terrain variations may cause the vehicle ride height to bounce, which may inadvertently cause the vehicle to impact the object. Thus, the suspension system 112 can add buffer height in some configurations.

As noted above, the controller 114 can be configured to identify objects in front of the first vehicle 102 and then determine, using dead reckoning, if the object is in a path of travel of the vehicle and that the object may likely travel under a restricted area of the vehicle. Dead reckoning can be used to infer the likely path of the vehicle over the object, and thus the location of the object once the object passes the MCS sensors on the front and/or the rear of the vehicle. Dead reckoning allows for inferences to be made in the areas underneath the vehicle where the MCS sensors cannot sense. Thus, between the MCS sensors on the front and rear of the vehicle, there exists a gap or dead zone.

The location and architecture of MCS sensors of the sensor platform 108 can be configured. Assuming a MCS sensor is capable of projecting a field up to two feet vertically toward the ground, and a few inches extending laterally outside the sensor periphery four to eight inches, this infers that the sensor may only have a few inches of clearance before the sensor is triggered by an incoming obstacle, such as a rock.

The controller 114 can be configured to require the MCS capacitance to be sampled at a faster refresh rate than typical for automotive applications. An example sampling target can include approximately 200 Hz to 1 kHz sampling, with four consecutive samples being used to decide, for a total latency of four to twenty milliseconds. To be sure, these configurations are not intended to be limiting. Assuming the first vehicle is traveling at 12 mph, this is equivalent to the vehicle moving between one to four inches before detection is triggered. To provide the most time to react to an obstacle, the MCS sensors can be placed as far in front of the first vehicle as possible to detect incoming obstacles while driving forward, and/or as far in the back to detect incoming obstacles while backing up.

As noted above, a multi-segment sensing area can be implemented. The controller 114 can map sensitive underbody areas of the car and use dead-reckoning to determine which of these areas might be hit by an object detected by one of the sensing elements.

Figure 2:
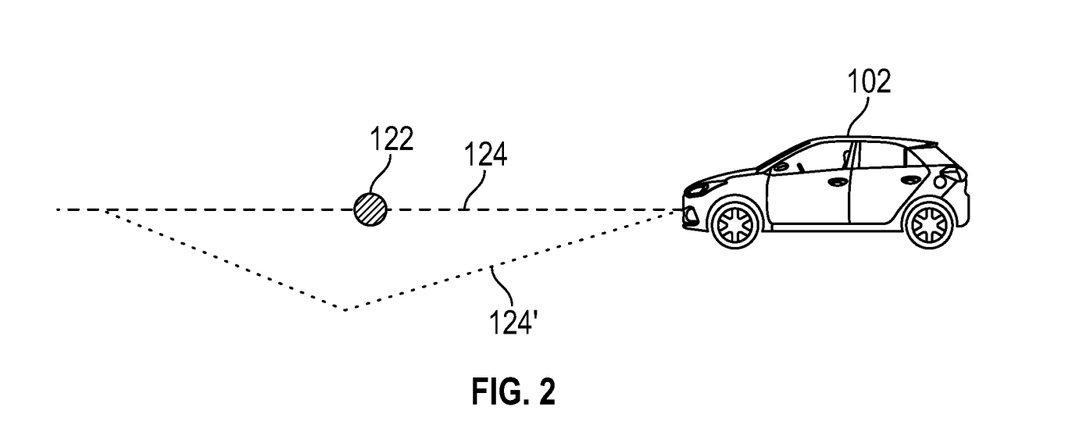
FIG. 2 schematically illustrates diversion of a vehicle around an object.

Referring now to FIGS. 1 and 2 collectively, one or more forward-facing cameras can be used to detect an object 122, such as an object that is in a path of travel 124 of the first vehicle 102. Each of the sensors in the sensor platform 108 can be coupled to the controller 114. The controller 114 can use the signals from the sensors and provide obstacle maneuver assistance in response, as will be described in greater detail herein. Additional use case examples will be provided herein as well. In general, the driver of the first vehicle 102 can adjust the path of travel 124 to an altered path of travel 124' in response to controller 114 remediations such as steering wheel feedback, audible warnings, a message displayed on a human-machine interface (HMI) or dashboard, and the like.

Once the restricted zones have been defined and mapped by the controller 114, the controller 114 can be configured to detect objects and take remediating action. That is, once the restricted zones have been defined and properly enabled with sensors, the controller 114 may detect an object on the road and/or trail and determine if a remediating action can be taken.

An object (e.g., a hazard in the path of the vehicle) is defined, in general, as an object 122 that is aligned with a path of travel 124 of the first vehicle 102. For example, the controller 114 can use camera images and other sensor input to identify a rock or other object in front of the vehicle and along the path of travel. Once that object has been identified, controller 114 can determine if its position aligns with the path of travel. If so, the controller 114 may identify it as a hazard, regardless of its dimensions.

In other instances, to consider the object to be a hazard, the controller 114 can also determine if the object has a size that may cause it to hit a vehicle component in a restricted zone if the first vehicle continues traveling along its current path of travel. For example, the object 122 may have a height that would result in the object 122 possibly contacting one or more of the restricted zones if the first vehicle 102 were to continue on its current course without deviation and the object 122 is determined to be likely to pass underneath one of the restricted zones.

In general, the controller 114 can classify an object as a hazard based on sensor input relative to one or more of the following: a path of travel of the vehicle with respect to the object, a vehicle ride height 136 or clearance with respect to a ground surface Gs and object 122, and the vehicle's suspension loading effect based off of terrain transition detected (i.e., transitions which may result in additional loading or bounce, and a likelihood that the object will encroach on a restricted zone). If classified as a hazard, the controller 114 can determine appropriate actions, including course and speed alteration to avoid, if possible, and/or mitigate the strike or impact force potential. One example of an appropriate action can include slowing or braking of the vehicle to a stop.

In some instances, the controller 114 can use the sensor platform 108 to not only identify the presence of objects, but also to determine object parameters in general, such as object height, diameter, shape, color, distinguishing features, appearance, and so forth. In one configuration forward looking radar can be used to characterize mass or type of an object.

In some instances, the controller 114 can detect dynamic objects on the road surface, such as and including ice or mud chucks and/or vehicle components, including piece of tire tread and/or springs, which may have been shed at speed by a leading vehicle and may not have come to rest yet. These objects could be sliding and spinning and may not take a predictable path given chaos theory and surface imperfections of the roadway. Object classified as dynamic may signal a strike or collision warning.

The controller 114 can also identify a location of the object using GPS. When object parameters are collected, these object parameters can be shared with other vehicles, such as the second vehicle 104 or a service provider 134. Maps can be created from these object parameters. When connected vehicles report object parameters to each other or back to the service provider 134, a crowdsource of objects can be created that can be aligned with trail maps or other similar mapping functions.

In one example use case, an electric vehicle (BEV) is being operated on an off-road trail where a large rock, big enough to hit the underside of the vehicle, is located. As the driver drives down a trail towards the rock, the vehicle senses that the rock is too big, or the terrain is sloped such that the rock may impact a restricted zone on the underside of the vehicle. The controller can determine the location of the rock from the sensors is within the width of the vehicle. Correspondingly, the controller can determine that the trail is too narrow to allow the vehicle to completely avoid the rock. The controller can calculate a solution that avoids impact with the rock. The controller can cause the vehicle to slow and nudge the steering wheel so as to steer the vehicle in a way that the rock harmlessly passes between the sensitive underbody components of the vehicle without it hitting any of them. In another example, if the controller 114 determines that a road is too narrow, the controller 114 can present a message to the user through an HMI to suggest reversing the path of the vehicle or trying to move a detected obstruction.

Referring back to FIG. 1 the first vehicle 102 is being driven with a frunk (a front storage area) loaded, resulting in the vehicle riding lower than normal and bouncing deeper on sudden surface changes. As such, the controller 114 can monitor the operating profile of the suspension system 112 and identify an object 122 as a hazard which normally would not be a problem except for the vehicle's adjusted ride height 136 and likelihood to bounce as the object 122 is located in a dip 138 of the trail surface or ground surface, Gs. Generally, the controller 114 can use the sensor platform 108 to map the topology of the ground surface Gs and also determine a location of the object 122 relative to the topology/shape of the ground surface Gs. In response, the controller 114 slows the first vehicle 102 to minimize any bounce and adjusts the path of travel (see FIG. 2) so as to reduce the likelihood that the object will strike into the charging coils or other restricted zone.

In another use case, the first vehicle 102 encounters a chunk of ice which was shed off of a vehicle immediately ahead of him. Because of the conditions and speed at which his vehicle is travelling, the controller 114 determines that providing steering guidance is an optimal choice to avoid the detected object. As the object was determined to be too large by the controller to completely clear the zones, it provides an impact warning to the driver. This incident is different from a use case involving a rock encountered on a trail. In that example, the controller 114 was able to slow the vehicle and guide the driver to steer the wheel/tire over the object, raising the vehicle's chassis to avoid the intrusion into the zone and possible impact.

If the object is particularly hard to traverse, the controller 114 may grant the driver remote park assist (RePA) control with steering capability to allow the user to observe the undercarriage while they progress the vehicle over the obstacle and adjust the vehicle direction via a steering HMI on a RePA application.

Figure 3:
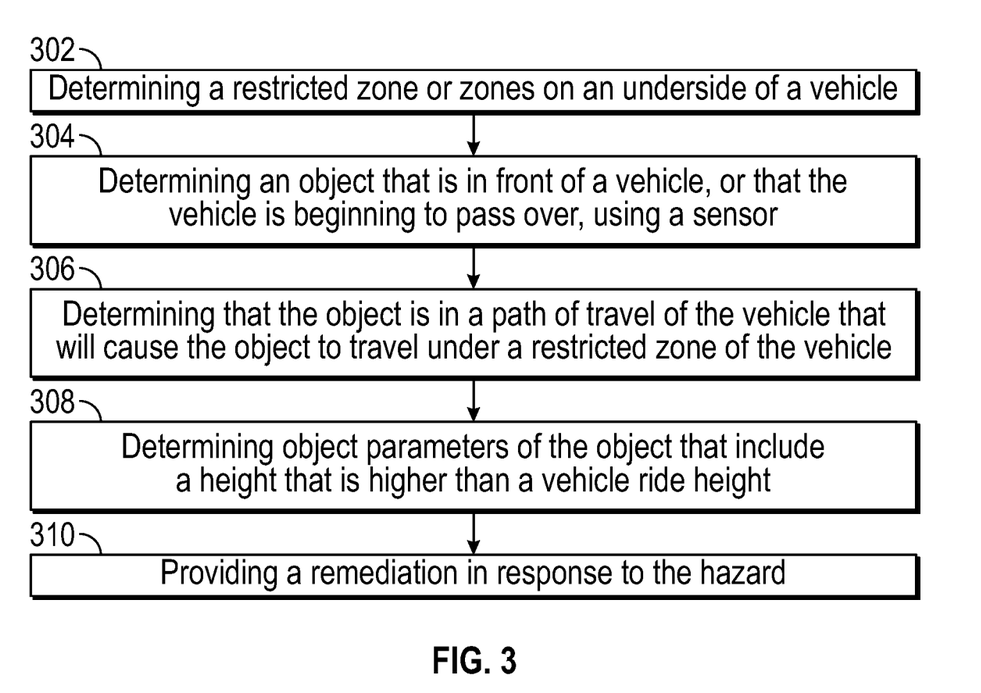
FIG. 3 is a flowchart of an example method of the present disclosure.

FIG. 3 is a flowchart of an example method. The method can be executed by a controller of a vehicle in order to mitigate or avoid impact with an object. As noted above, the object may damage a sensitive vehicle component that is located in a restricted zone underneath a vehicle.

Initially, the method can include a step 302 of determining a restricted zone or zones on an underside of a vehicle. Again, a restricted zone is an area surrounding a vehicle component that is sensitive to impact. The mapping identifies these locations relative to the overall layout of the chassis or underside of the vehicle.

The method can include a step 304 of determining an object that is in front of a vehicle, or that the vehicle is beginning to pass over, using a sensor. For example, the object can be detected using a camera. Images obtained by the camera can be processed using image recognition logic. In another example, the object can be identified using LiDAR, radar, or ultrasonic sensing. In another example, the sensor is an MCS sensor. It will be understood that cameras can be used to detect objects that are further away, whereas sensors such as radar or ultrasonic may sense objects only when close.

Once an object has been detected, the method can involve determining if the object is a hazard. The method can include a step 306 of determining that the object is in a path of travel of the vehicle that will cause the object to travel under a restricted zone of the vehicle. In some instances, this determination is a gross identification that the object is generally in a path of travel. As the vehicle gets closer to the object, the estimated path of the object underneath the vehicle can be refined or made more granular.

The method can include a step 308 of determining object parameters of the object that include a height that is higher than a vehicle ride height. Object parameters can include not only height, but also diameter, distinguishing features, and so forth. Some object parameters, such as height may be determinable when the object is still at a distance using camera images or LiDAR. Other object parameters may only be determinable as the vehicle begins to pass over the object. For example, MCS sensors can be placed on a terminal edge of the front bumper. As the MCS sensors pass over the object, object parameters can be determined. Because the bumpers may be set above some of the critical components underneath the vehicle, when the object is determined to be a hazard when passing under the MCS sensors, appropriate remediation action may occur. The process used to infer the location of the object/hazard once it has passed the MCS sensors may involve using dead reckoning.

In general, remediating actions can be taken before the object is encountered or as the object begins to pass underneath a front or rear of the vehicle. Even when an object/hazard is sensed as the vehicle is passing over the object/hazard, remediations such as steering adjustments can still be used to effectively avoid the object hitting a restricted zone. Of course, vehicle speed may affect how these remediations can be performed, but generally, slight steering modifications may be used to avoid impacts, even when the object is detected late (e.g., when vehicle is passing over the object). Again, one remediation can include suggesting through a message that the driver alter the vehicle path or remove obstacles. When the object or obstruction is another vehicle, a remediation measure could include transmitting a message to the other vehicle to suggest that they alter their path as well. This adjustment can be accomplished by causing a driver assistance system to automatically alter the path of travel of the vehicle to avoid the object or avoid the object from passing under a restricted zone if the object cannot be diverted around.

Once an object is determined to be a hazard, the method can include a step 310 of providing a remediation in response to the object. The remediation can include altering a path of travel of the vehicle. For example, automatic steering commands can be used to steer the vehicle away from the object. When the object is identified when the vehicle is further away, the vehicle can be diverted around the object. When the object is not identified until it is sensed by MCS sensors as the vehicle passes over the object, there is no opportunity to divert. Other types of remediations may be used such as slight steering adjustments to prevent the object from passing directly under a restricted zone.

Another example remediating action can include causing a suspension system of the vehicle to selectively alter the vehicle ride height to be greater than the height of the object. Again, a selected vehicle ride height can correspond to a height needed to allow the object/hazard to clear the underneath of the vehicle. The needed height value may be affected by terrain, slope, object shape/size (object parameters), vehicle loading, vehicle speed, and/or combinations thereof. In some instances, adjustments to the suspension system can involve determining a loading of a suspension system of the vehicle and adjusting a vehicle speed based on the loading of the suspension system and the object parameters of the object.

Figure 4:
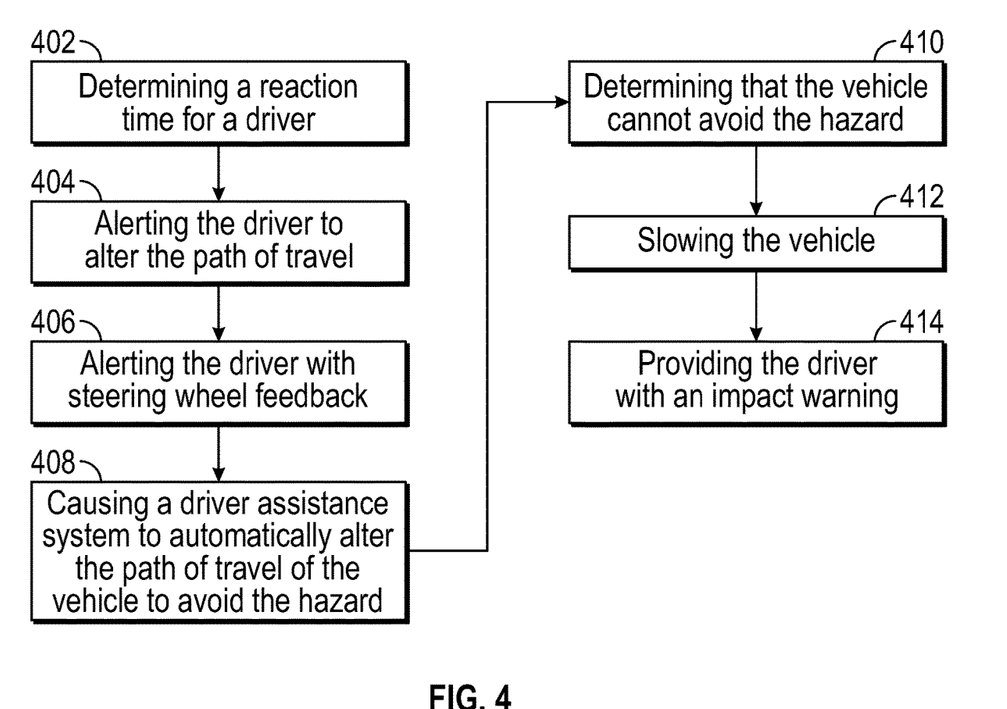
FIG. 4 is a flowchart of another example method of the present disclosure.

FIG. 4 is a flowchart of an example sub-method related to a remediating action. The method can include a step 402 of determining a reaction time for a driver. As noted, the reaction time is determined in response to a speed of the vehicle and a distance from the object. The method can include a step 404 of alerting the driver to alter the path of travel, along with a warning corresponding to the reaction time. In one example, the driver may be informed that they may hit the object in the next ten seconds.

A message can be displayed on an HMI of the vehicle that warns the driver to avoid the object by navigating around the object. The method can also include a step 406 of alerting the driver with steering wheel feedback. Rather than, or in addition to steering wheel feedback, alerts can include seat vibration, Forward Collision Alert, or audible sound of various intensities mapped to risk. In some instances, the method can include a step 408 of causing a driver assistance system to automatically alter the path of travel of the vehicle to avoid the object. Again, these alterations can include complete diversions around the object or small diversions executed in an attempt to avoid the object/hazard contacting a sensitive vehicle component.

In some instances, the method can include a step 410 of determining that the vehicle cannot avoid the object. For example, camera images or the driver assistance system may indicate that the vehicle cannot deviate from its current path of travel. For example, the vehicle may be operating on a narrow road or on a multi-lane road with traffic. In these instances, the method can include a step 412 slowing the vehicle and/or a step 414 of providing the driver with an impact warning.

Implementations of the systems, apparatuses, devices and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A vehicle comprising: a sensor platform comprising a micro-capacitive sensor (MCS); a controller comprising a processor and memory, the processor executing instructions stored in the memory to: determine, using the MCS, an object that is in front of the vehicle using the sensor platform; determine, using the MCS, the object as a hazard by at least one of: determining that the object is in a path of travel of the vehicle that will cause the object to travel under a restricted zone of the vehicle; and/or determining object parameters of the object that include a height that is higher than a vehicle ride height; determine a reaction time for a driver, the reaction time being determined in response to a speed of the vehicle; alert the driver to alter the path of travel; alert the driver with steering wheel feedback; and cause the vehicle to automatically adjust the path of travel of the vehicle to avoid the object.

2. The vehicle according to claim 1, wherein the sensor platform comprises one or more sensors placed on either or both of a front bumper or a rear bumper of the vehicle.

3. The vehicle according to claim 1, wherein the controller is configured to map an underside of the vehicle to determine the restricted zone of the vehicle.

4. The vehicle according to claim 3, wherein the restricted zone is defined by a vehicle component that is sensitive to impact from the object.

5. The vehicle according to claim 1, further comprising a driver assistance system, the controller being configured to cause the driver assistance system to automatically alter the path of travel of the vehicle to avoid the object.

6. The vehicle according to claim 1, wherein the controller is configured to:
determine that the object cannot be avoided; and
provide a warning to a driver that the object cannot be avoided.

7. The vehicle according to claim 1, wherein the controller is configured to:
determine, by the sensor platform, a terrain transition;
determine, based on the terrain transition, a suspension loading effect of a suspension of the vehicle; and
cause a suspension system of the vehicle to selectively alter the vehicle ride height to be greater than the height of the object and a height associated with a movement of the suspension system based on the suspension loading effect.

8. The vehicle according to claim 1, wherein the controller is configured to transmit the object parameters to another vehicle or a service provider.

9. The vehicle of claim 1, wherein determining an object that is in front of the vehicle is performed without using a camera.

10. A method, comprising:
determining an object that is in front of a vehicle using a sensor comprising a micro-capacitive sensor (MCS);
determining, using the MCS, the object as a hazard by at least one of:
determining that the object is in a path of travel of the vehicle that will cause the object to travel under a restricted zone of the vehicle; and/or
determining object parameters of the object that include a height that is higher than a vehicle ride height;
determining a reaction time for a driver, the reaction time being determined in response to a speed of the vehicle;
alerting the driver to alter the path of travel;
alerting the driver with steering wheel feedback; and
selectively altering, by a suspension system of the vehicle, the vehicle ride height to be greater than the height of the object.

11. The method according to claim 10, further comprising mapping an underside of the vehicle to determine the restricted zone of the vehicle.

12. The method according to claim 11, wherein the restricted zone is defined by a vehicle component that is sensitive to impact from the object.

13. The method according to claim 10, further comprising causing a driver assistance system to automatically alter the path of travel of the vehicle to avoid the object.

14. The method according to claim 10, further comprising: determining that the vehicle cannot avoid the object; slowing the vehicle; and providing the driver with an impact warning.

15. The method according to claim 10, further comprising:
determining a topology of a ground surface, a location of the object relative to the ground surface;
determining a loading of a suspension system of the vehicle; and adjusting a vehicle speed based on the loading of the suspension system and the object parameters of the object.

16. The method according to claim 10, further comprising using dead reckoning to determine when the object will pass underneath the restricted zone, and wherein dead reckoning is used between locations where the sensor and one or more additional sensors are present on the vehicle.

17. The method according to claim 10, further comprising determining a portion of the object parameters when a front or rear of the vehicle passes over the object.

18. A method, comprising:
   determining an object that is in front of a vehicle using a micro-capacitive sensor (MCS);
   determining, using the MCS, the object as a hazard by at least one of:
      determining that the object is in a path of travel of the vehicle that will cause the object to travel under a restricted zone of the vehicle; and/or
      determining object parameters of the object that include a height that is higher than a vehicle ride height;
   determining a reaction time for a driver, the reaction time being determined in response to a speed of the vehicle;
   alerting the driver to alter the path of travel;
   alerting the driver with steering wheel feedback; and
   automatically altering, by a driver assistance system of the vehicle, the path of travel of the vehicle to avoid the object.

* * * * *